Oct. 21, 1952 A. G. SHENNAN 2,614,865
MANIFOLD SET
Filed May 12, 1951 2 SHEETS—SHEET 1
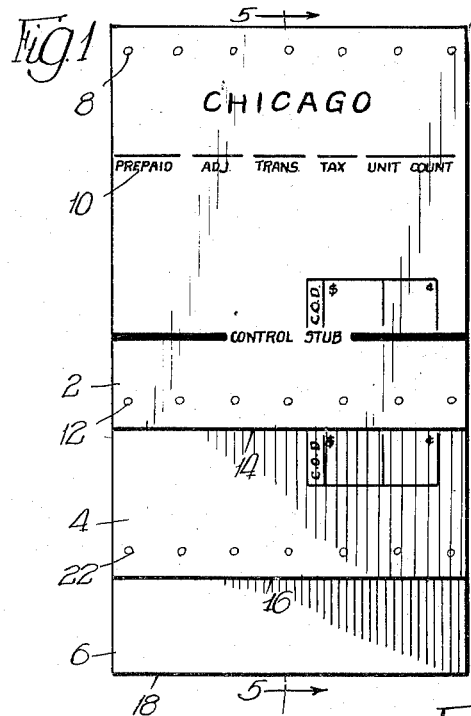
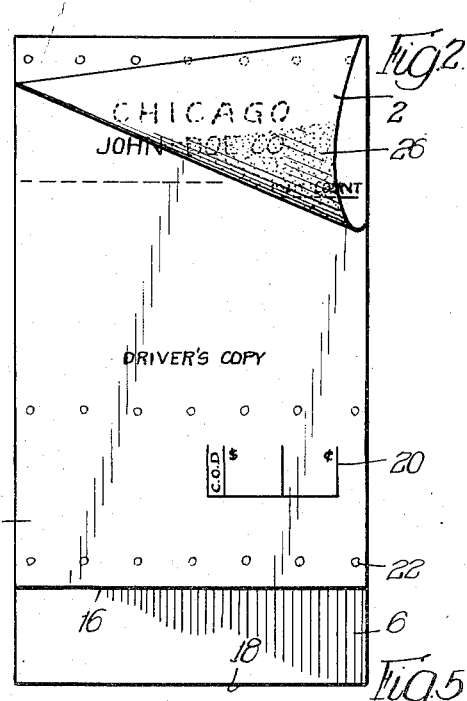
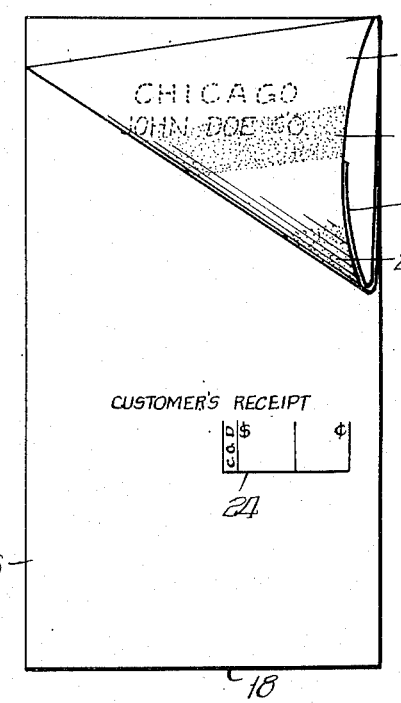
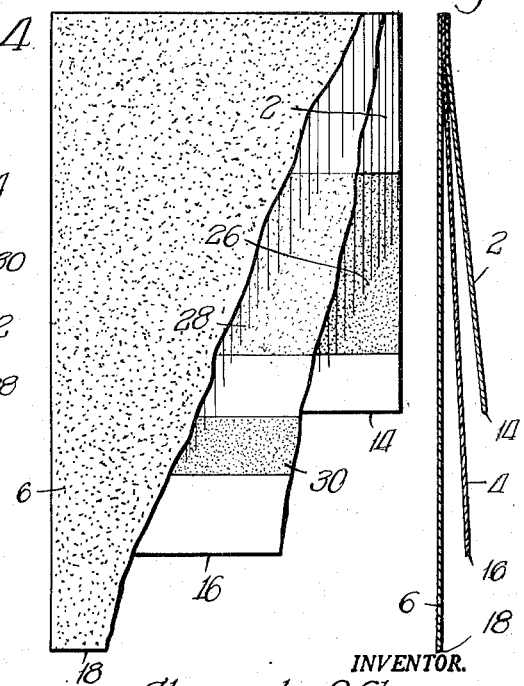
INVENTOR.
Alexander G. Shennan,
BY
Wilkinson, Huxley, Byron & Hume
ATTYS Oct. 21, 1952 A. G. SHENNAN 2,614,865
MANIFOLD SET
Filed May 12, 1951 2 SHEETS—SHEET 2
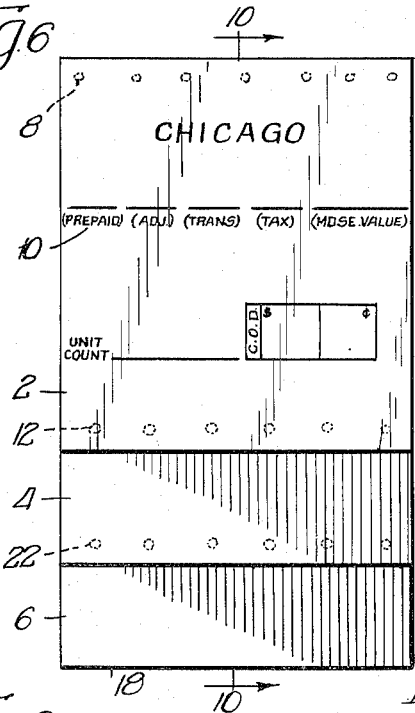
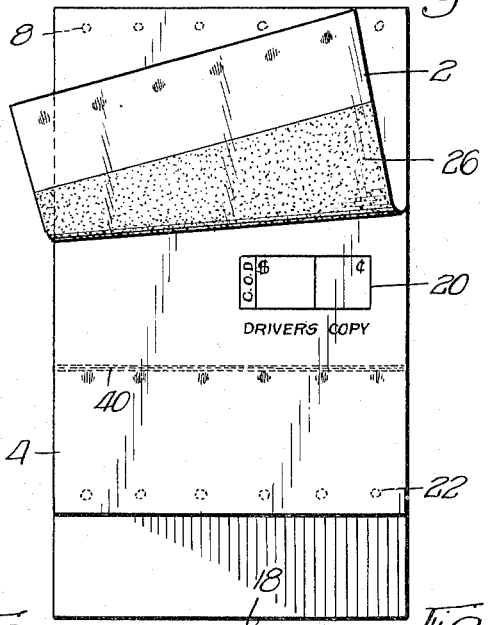
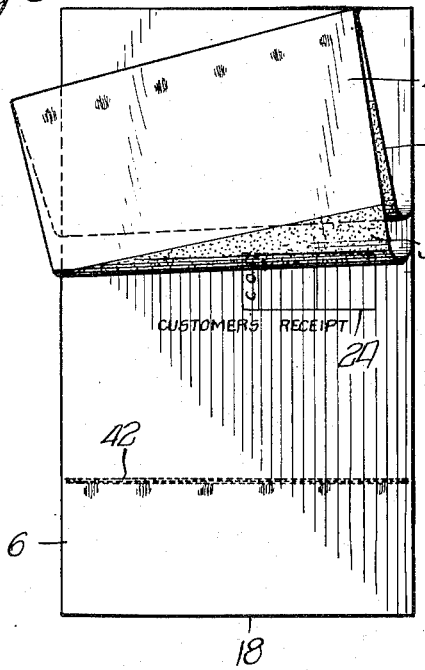
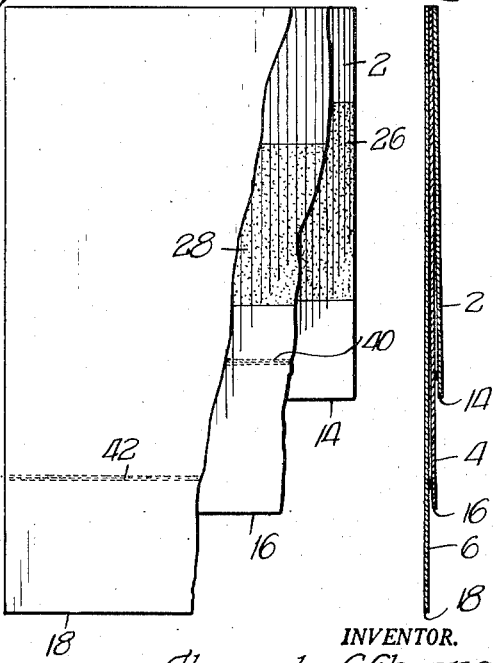
INVENTOR.
Alexander G. Shennan Patented Oct. 21, 1952

2,614,865

UNITED STATES PATENT OFFICE 2,614,865

MANIFOLD SET

Alexander G. Shennan, Oak Park, Ill., assignor to International Tag & Salesbook Company, Chicago, Ill., a corporation of Illinois Application May 12, 1951, Serial No. 225,983

5 Claims. (Cl. 282—22)

The present invention relates to manifold sets and more particularly to such sets adapted especially for use in connection with the preparation for and the shipment of goods whereby a complete and accurate record of the sale, shipment and receipt thereof by the purchaser is available to both the seller and purchaser.

Among the objects of the present invention is to provide a simple and inexpensive manifold set readily and conveniently applied to merchandise or containers enclosing the same for recording information which is readily available to the seller, shipper and purchaser.

Another object of the present invention is to provide a novel manifold set characterized in its assembled form as being readily secured or attached to merchandise or a container enclosing the same and having a plurality of sheets for producing a plurality of copies relating to a given transaction which may be removed successively from the assembly at the proper time to maintain an internal check on the transaction until completed.

While the manifold sets made in accordance with the present invention find utility in various types of transactions where it is desirable that plural or manifold copies thereof be made, the invention is particularly characterized by its adaptability for use in connection with the sale of merchandise on a C. O. D. basis where records are to be kept of the transaction, where a check on the accountability of the person or firm delivering the same for monies received is a necessity and where a customer's receipt is required to protect the purchaser for monies paid upon receipt of the goods.

The present application is a continuation-in-part of my abandoned application Serial No. 92,664, filed May 11, 1949, for Manifold Set.

Other objects, features, capabilities and advantages are comprehended by the invention, as will later appear and as are inherently possessed thereby.

Referring to the drawings:

Figure 1 is a top or front plan view of a manifold set made in accordance with the present invention;

Figure 2 is a view similar to Figure 1 of the drawings with the top sheet rolled back to disclose the construction of the assembly more in detail;

Figure 3 is a view similar to Figure 2 of the drawings in which the top and the next adjacent sheets are rolled or folded back for the purpose of more particularly disclosing the assembly;

Figure 4 is a view of the back of the manifold set with parts broken away to illustrate the construction of the assembly more in detail;

Figure 5 is a vertical cross-sectional view taken in the plane represented by line 5—5 of Figure 1 of the drawings.

Figure 6 is a top or front plan view of a manifold set of modified construction;

Figure 7 is a view similar to Figure 6 with the top sheet rolled back to disclose the construction of the assembly more in detail;;

Figure 8 is a view similar to Figure 7 in which the top and next adjacent sheets are rolled or folded back for the purpose of more particularly disclosing the assembly;

Figure 9 is a view of the back of the manifold set of Figure 6 with parts broken away to illustrate the construction of the assembly more in detail; and Figure 10 is a vertical cross-sectional view taken in the plane represented by line 10—10 of Figure 6 of the drawings.

Referring now more in detail to the drawings, a manifold set made in accordance with the present invention and selected to illustrate one embodiment thereof is disclosed in Figures 1 to 5 as comprising a plurality of superposed sheets 2, 4 and 6 assembled in a form for ready use in the sale and shipment of merchandise, the three sheets 2, 4 and 6 constituting an office record, a driver's copy of the transaction, and a copy adapted to be applied to the goods or a container enclosing an article or articles, which serves as a customer's receipt.

While the manifold sets herein disclosed embody in their assembly three superposed sheets as above identified, nevertheless, the invention contemplates the use of any number of such sheets constructed and arranged in accordance with the following description.

The superposed sheets 2, 4 and 6 are separably secured along one of the aligned marginal edges thereof by means of adhesive material 8 applied in the form of spaced spots to provide for spot-gumming or spot-pasting to secure the adjacent edges together to form the assembly and to provide for the ready detachability of successive sheets as desired from the remaining assembled sheets. The top sheet 2, at its opposite marginal edge 14, terminates in spaced relation to the opposite marginal edge 16 of sheet 4 and is provided with indicia 10 which may be arranged in any desired pattern for the particular business or transaction for which the manifold set is designed. In the selected illustrative example of the invention the indicia indicates that the set is to be used for a C. O. D. order and in accordance with the invention is attached, as will be hereinafter more fully explained, to merchandise which has been purchased, or to a container enclosing the same, and which is to be shipped to a purchaser and paid for by said purchaser at the time of receipt. The sheet 2 is affixed to sheet 4 by a line of adhesive 12 applied in the form of a plurality of spots spaced from the marginal edge 14 to provide an area between the line of adhesive 14 and the marginal edge 14 which may be readily grasped by the seller's employee to remove the sheet 2 from the assembly. This sheet is filed as an office record of the sale at the time such merchandise is prepared for shipment. The spot-pasting or spot-gumming 12 also serves to maintain the sheet 2 in assembled relation until such time as it is ready for removal from the assembly. All of the pertinent data with respect to the sale may be recorded on this office record sheet.

The sheet 4 is of a length less than the length of sheet 6 and the marginal edge 16 thereof is disposed in offset relation to the marginal edge 18 of the sheet 6, as well as the marginal edge 14 of sheet 2. This second sheet is provided with suitable space for the transfer of recorded data on sheet 2 and the same may have any desired indicia 20 applied to the face thereof for identifying recorded data which may be transferred from sheet 2 or originally applied thereto by the seller's employee. This sheet is identifiable as a driver's copy of the transaction which the driver removes from the assembly upon receipt of the merchandise for delivery, the same being secured in spaced relation to the marginal edge 16 by a line of adhesive 22 applied in the form of spots, whereby the free end of the sheet 4 is secured to the sheet 6, yet providing an area adjacent the marginal edge 16 which can be readily grasped by a driver for separating the sheet 4 from sheet 6. Sheet 4 therefore constitutes a record that the merchandise has been received by the driver and is returned to the seller by the driver after delivery of the merchandise to be filed as a duplicate copy of the transaction to indicate that the merchandise has been received by the customer. This sheet also serves to facilitate the accounting made by the driver for the receipt of money collected by him for goods which have been delivered.

Sheet 6 constitutes the bottom sheet of the manifold set and, accordingly, the application of adhesive to the back surface thereof is desirable for the purpose of securing the entire assembly to the merchandise or the container enclosing the same at the time such merchandise is prepared for shipment. The sheet is further characterized as providing a space for the transfer of recorded data on sheets 2 and 4 and may be provided with any suitable indicia 24 for identifying such recorded data.

As previously indicated, the invention contemplates the use of transfer means for reproducing recorded data applied to sheets 2 and 4 onto the next successive sheets 4 and 6, respectively. Such means may take the form of separate carbon sheets which may be inserted between sheets 2, 4 and 6 either loosely or bound into the assembly as a part thereof, or such transfer means may take the form as illustrated, wherein the same is shown as being applied to the under-face of sheets 2 and 4 over appropriate areas conforming to the form which the indicia 10 and 20 may take. For example, the transfer means is applied over the area indicated as 26 on the under-face of sheet 2 and to the spaced areas 28 and 30 on the under-face of sheet 4.

It will be apparent that the lines of adhesive material 12 and 22 in the form of spots provides a construction in which a suitable area is available to be readily grasped by the seller's employee or agent, as above indicated, and at the same time maintain sheets 2 and 4 in proper assembled relation with sheet 6. While the specific illustration of the invention discloses spot-pasting or spot-gumming of the indicated adjacent sheets, nevertheless, the invention contemplates the provision of a thin, continuous line of adhesive which functions satisfactorily in securing the said sheets together, yet facilitating the removal thereof when desired.

Figures 6 to 10, inclusive, disclose a manifold set of modified construction, the same including certain additional features over the disclosure of Figures 1 to 5 for a purpose to be more fully described hereinafter. The manifold set of Figures 6 to 10 conforms in all essentials to the embodiment of Figures 1 to 5, and accordingly like reference numerals have been applied to designate like or similar elements. As will be noted, the manifold set embodies three superimposed sheets 2, 4 and 6 assembled in a form for ready use by securing means in the form of adhesive material 8, adjacent the upper marginal edges thereof, the said sheets being secured in the manner disclosed in the previously described embodiment by adhesive materials 12 and 22 whereby the top or upper sheet may be successively removed from the underlying sheet for the purposes hereinbefore described.

While Figures 1 to 5 disclose a manifold set embodying the broad conception of applicant's invention, nevertheless it has been found that in many instances there is a tendency for the top surface of the underlying sheets to be pulled away with the adhesive material when the overlying or top sheets are successively separated from said underlying sheets. Under such circumstances, there is always a danger that recorded data applied to sheets 4 and 6 will be removed or displaced with the top surface of the sheet, thus rendering the same illegible. In order to overcome any possibility of this happening, the present embodiment contemplates the provision of indentations impressed in the top surface of sheets 4 and 6 and adjacent the adhesive material which function to provide such discontinuity in the interconnected, interlocking fibers forming the top surface of these sheets so that successive or overlying top sheets may be separated from the next adjacent underlying sheet without pulling the surface of the paper away with the adhesive material and thus eliminating any possibility of rendering the recorded data illegible.

In the illustrative embodiment of Figure 6 to 10, the sheets 4 and 6 are provided with indentations 40 and 42, respectively, such indentations extending substantially transversely across said sheets and inwardly of the spots of adhesive material 12 and 22. Such line of indentations as illustrated consists of three rows spaced a slight distance apart, though the formation of these indentations may take any desired form and spacing, and as a matter of fact, do not have to be continuous in order to function in the desired manner. For example, such indentations are desired only in longitudinal alignment with the spots of adhesive material, although because of manufacturing procedures, the same may be provided more readily in the form disclosed. Furthermore, in the event that a continuous line of adhesive material is used between these adjacent sheets, a continuous line of indentations is desirable.

As will be apparent, the said indentations break the continuity of the top surface of these underlying sheets, so that as the top sheets are successively removed, rupture of the top surface of the paper is effected at the line of indentations and is not continued to the adjacent surface portions to render the recorded data illegible.

As will be apparent, these indentations are not perforations and do not penetrate through the sheet, inasmuch as such weakening of the sheet would destroy the purpose for which the manifold set was designed. Such indentations are highly desirable in manifold sets of the type herein disclosed, and serve a very useful purpose in the manner indicated.

While I have herein described and upon the drawings shown illustrative embodiments of the invention, it is to be understood that the invention is not limited thereto but may comprehend other constructions, arrangements of parts, details and features without departing from the spirit of the invention.

I claim:

1. A manifold set comprising a plurality of superposed sheets separably secured together adjacent one of the marginal edges thereof, said sheets being of different lengths with each underlying sheet being longer than the next adjacent overlying sheet, whereby the marginal edges opposite said first named marginal edges are offset with respect to one another, adhesive material adjacent the second named marginal edge for readily detachably securing certain of said sheets to the next adjacent sheet in spaced parallel relation to said second named marginal edge to provide an area adjacent thereto adapted to be grasped to successively remove sheets from the set, each of said underlying sheets secured to the next adjacent overlying sheet being provided with indentations disposed inwardly of said adhesive material to permit removal of each successive top sheet from the set without pulling the surface of the underlying sheet beyond said indentations away with said adhesive material, and transfer means for reproducing recorded data applied to certain sheets onto the sheets below.

2. A manifold set comprising a plurality of superposed sheets separably secured together adjacent their top marginal edges by adhesive material applied in the form of spaced spots, said sheets being of different lengths with each underlying sheet being longer than the next adjacent overlying sheet, whereby the bottom marginal edges are offset with respect to one another, adhesive material applied adjacent the bottom marginal edge in the form of spots for readily detachably securing certain sheets to the next adjacent sheets in spaced relation to the said bottom marginal edge to provide an area adjacent thereto adapted to be grasped to successively remove sheets from the set, each of said underlying sheets secured to the next adjacent overlying sheet being provided with indentations disposed inwardly of said adhesive material to permit removal of each successive top sheet from the set without pulling the surface of the underlying sheet beyond said indentations away with said adhesive material, and transfer means for reproducing recorded data applied to certain sheets onto the sheets below.

3. A manifold set comprising a plurality of superposed sheets separably secured together adjacent one of the marginal edges thereof, said sheets being of different lengths with each underlying sheet being longer than the next adjacent overlying sheet, whereby the marginal edges opposite said first named marginal edges are offset with respect to one another, adhesive material adjacent the second named marginal edge for readily detachably securing certain of said sheets to the next adjacent sheet in spaced parallel relation to said second named marginal edge to provide an area adjacent thereto adapted to be grasped to successively remove sheets from the set, each of said underlying sheets secured to the next adjacent overlying sheet being provided with indentations disposed inwardly of said adhesive material to permit removal of each successive top sheet from the set without pulling the surface of the underlying sheet beyond said indentations away with said adhesive material, adhesive material applied to the back face of the lowermost sheet for securing said set to an article, and transfer means for reproducing recorded data applied to certain sheets onto the sheets below.

4. A manifold set comprising a plurality of superposed sheets separably secured together adjacent their top marginal edges by adhesive material applied in the form of spaced spots, said sheets being of different lengths with each underlying sheet being longer than the next adjacent overlying sheet, whereby the bottom marginal edges are offset with respect to one another, adhesive material applied adjacent the bottom marginal edge in the form of spots for readily detachably securing certain sheets to the next adjacent sheets in spaced relation to said bottom marginal edge to provide an area adjacent thereto adapted to be grasped to successively remove sheets from the set, each of said underlying sheets secured to the next adjacent overlying sheet being provided with indentations disposed inwardly of said adhesive material to permit removal of each successive top sheet from the set without pulling the surface of the underlying sheet beyond said indentations away with said adhesive material, adhesive material applied to the back face of the lowermost sheet for securing said set to an article, and transfer means for reproducing recorded data applied to certain sheets onto the sheets below.

5. A manifold set comprising a plurality of superposed sheets separably secured together adjacent their top marginal edges by adhesive material, said sheets being of different lengths with each underlying sheet being longer than the next adjacent overlying sheet, whereby the bottom marginal edges are offset with respect to one another, adhesive material adjacent the bottom marginal edge for readily detachably securing certain sheets to the next adjacent sheets in spaced relation to said bottom marginal edge to provide an area adjacent thereto adapted to be grasped to successively remove sheets from the set, each of said underlying sheets secured to the next adjacent overlying sheet being provided with indentations disposed inwardly of said adhesive material to permit removal of each succesive top sheet from the set without pulling the surface of the underlying sheet beyond said indentations away with said adhesive material, adhesive material applied to the back face of the lowermost sheet for securing said set to an article, and transfer means applied to the back of the other sheets for reproducing recorded data applied thereto.

ALEXANDER G. SHENNAN.

REFERENCES CITED

The following references are of record in the file of this patent:

UNITED STATES PATENTS

| Number | Name | Date |
|---|---|---|
| 797,302 | Meacham | Aug. 15, 1905 |
| 1,181,482 | Roedell et al. | May 2, 1916 |
| 1,281,897 | Bender | Oct. 15, 1918 |
| 2,092,127 | Lankton | Sept. 7, 1937 |
| 2,352,134 | Stone | June 20, 1944 |
| 2,546,584 | Brock, Jr. | Mar. 21, 1951 |